US012567257B2

(12) United States Patent
Zhu et al.

(10) Patent No.: US 12,567,257 B2
(45) Date of Patent: *Mar. 3, 2026

(54) METHOD AND APPARATUS FOR OBSTACLE RECOGNITION, DEVICE, MEDIUM, AND ROBOT LAWN MOWER

(71) Applicants:Suzhou Cleva Precision Machinery & Technology Co., Ltd., Suzhou (CN); Skybest Electric Appliance (Suzhou) Co., Ltd., Suzhou (CN)

(72) Inventors: Shaoming Zhu, Suzhou (CN); Xue Ren, Suzhou (CN)

(73) Assignees: Suzhou Cleva Precision Machinery & Technology Co., Ltd., Suzhou (CN); Skybest Electric Appliance (Suzhou) Co., Ltd., Suzhou (CN)

( * ) Notice: Subject to any disclaimer, the term of this patent is extended or adjusted under 35 U.S.C. 154(b) by 308 days.

This patent is subject to a terminal disclaimer.

(21) Appl. No.: 18/258,268

(22) PCT Filed: Dec. 21, 2021

(86) PCT No.: PCT/CN2021/139877
§ 371 (c)(1),
(2) Date: Jun. 19, 2023

(87) PCT Pub. No.: WO2022/135361
PCT Pub. Date: Jun. 30, 2022

(65) Prior Publication Data
US 2024/0071079 A1 Feb. 29, 2024

(30) Foreign Application Priority Data
Dec. 21, 2020 (CN) .......................... 202011519876.9

(51) Int. Cl.
*G06V 20/50* (2022.01)
*A01M 21/00* (2006.01)
(Continued)

(52) U.S. Cl.
CPC ............. *G06V 20/50* (2022.01); *A01M 21/00* (2013.01); *G06V 10/34* (2022.01); *G06V 10/50* (2022.01); *G06V 10/56* (2022.01)

(58) Field of Classification Search
None
See application file for complete search history.

(56) References Cited

U.S. PATENT DOCUMENTS

| | | | |
|---|---|---|---|
| 2014/0032033 A1 | 1/2014 | Einecke et al. | |
| 2015/0085322 A1* | 3/2015 | Masaru .............. | G06K 15/1878 |
| | | | 358/3.21 |

FOREIGN PATENT DOCUMENTS

| | | |
|---|---|---|
| CN | 111324122 A | 6/2020 |
| CN | 111339961 A | 6/2020 |

(Continued)

OTHER PUBLICATIONS

Steen et al., "Detection of Bird Nests during Mechanical Weeding by incremental Background modeling and Visual Saliency", DOI: https://doi.org/10.3390/s150305096 (Year: 2015).*

(Continued)

*Primary Examiner* — Chan S Park
*Assistant Examiner* — Promotto Tajrian Islam
(74) *Attorney, Agent, or Firm* — JK Intellectual Property Law, PA

(57) ABSTRACT

An obstacle recognition method includes the steps of obtaining hue information of a candidate weeding region image; generating a target hue histogram of the candidate weeding region image according to the hue information, and obtaining peak information and hue range information of the target hue histogram; and determining whether there are obstacles in the candidate weeding region image according to the peak information and the hue range information. Related apparatus, electronic devices, computer readable storage media, and weeding robots are disclosed.

9 Claims, 2 Drawing Sheets

(51) Int. Cl.
    *G06V 10/34*      (2022.01)
    *G06V 10/50*      (2022.01)
    *G06V 10/56*      (2022.01)

(56)          References Cited

FOREIGN PATENT DOCUMENTS

| | | |
|---|---|---|
| CN | 111353431 A | 6/2020 |
| CN | 111830988 A | 10/2020 |

OTHER PUBLICATIONS

Said et al., "Real-time multi-object detection and tracking for autonomous robots in uncontrolled environments", DOI: 10.1109/ICCES.2012.6408485 (Year: 2013).*

Hassanein et al., "A New Vegetation Segmentation Approach for Cropped Fields Based on Threshold Detection from Hue Histograms", DOI: https://doi.org/10.3390/s18041253 (Year: 2018).*

International Search Report for Application No. PCT/CN2021/139877, dated Mar. 23, 2022.

* cited by examiner

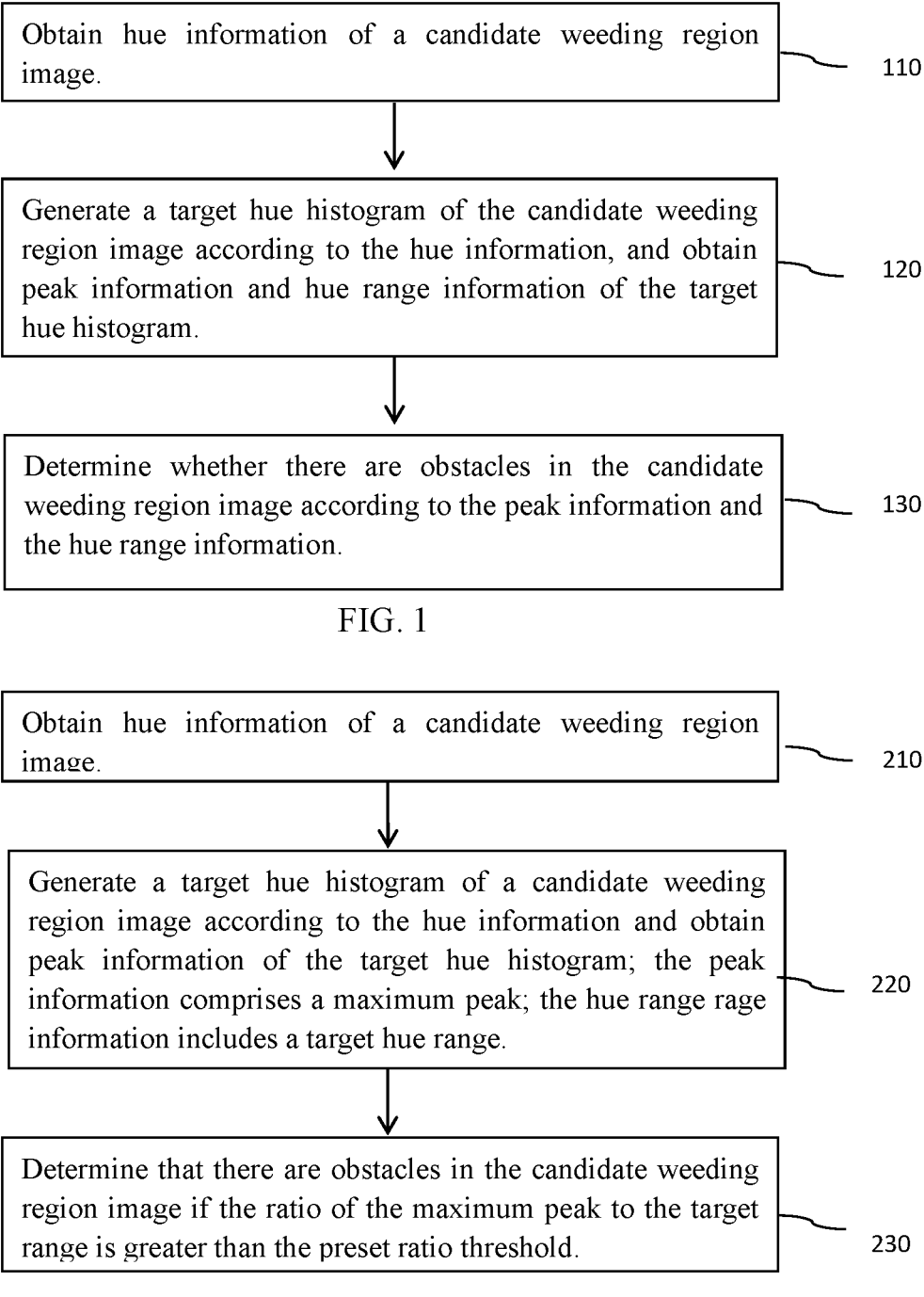

Obtain hue information of a candidate weeding region image. — 110

Generate a target hue histogram of the candidate weeding region image according to the hue information, and obtain peak information and hue range information of the target hue histogram. — 120

Determine whether there are obstacles in the candidate weeding region image according to the peak information and the hue range information. — 130

FIG. 1

Obtain hue information of a candidate weeding region image. — 210

Generate a target hue histogram of a candidate weeding region image according to the hue information and obtain peak information of the target hue histogram; the peak information comprises a maximum peak; the hue range rage information includes a target hue range. — 220

Determine that there are obstacles in the candidate weeding region image if the ratio of the maximum peak to the target range is greater than the preset ratio threshold. — 230

FIG. 2

| Information obtaining module | | Histogram generation module | | Obstacle determination module |
|---|---|---|---|---|
| 310 | | 320 | | 330 |

METHOD AND APPARATUS FOR OBSTACLE RECOGNITION, DEVICE, MEDIUM, AND ROBOT LAWN MOWER

CROSS-REFERENCE TO RELATED PATENT APPLICATIONS

This application is a national stage of International Application No. PCT/CN2021/139877, filed on Dec. 21, 2021, which claims priority to CN patent application No. 202011519876.9, filed on Dec. 21, 2020. All of the aforementioned applications are hereby incorporated by reference in their entireties.

TECHNICAL FIELD

Embodiments of the present disclosure relate to a computer technology, in particular to an obstacle recognition method and apparatus, a device, a medium, and a weeding robot.

BACKGROUND

With the improvement of living standards, people are increasingly concerned about environmental construction, so the construction of urban green gardens receives increasing attention. Meanwhile, efficient green maintenance, such as daily weeding, has gradually become a demand. However, because conventional weeding machines need manual control, weeding robots with autonomous working functions are gradually emerging.

In existing technologies, boundaries of weeding regions of weeding robots are generally calibrated by burying boundary lines, which consumes a lot of manpower and material resources and increases costs. In addition, the burying of the boundary lines is limited, for example, corners cannot be less than 90 degrees, so the shape of a weeding region is limited to some extent.

SUMMARY

Embodiments of the present disclosure provide an obstacle recognition method and apparatus, a device, a medium, and a weeding robot to improve recognition efficiency and accuracy of obstacles in a candidate weeding region of a weeding robot.

In a first aspect, an embodiment of the present disclosure provides an obstacle recognition method, the method includes:

obtaining hue information of a candidate weeding region image;

generating a target hue histogram of the candidate weeding region image according to the hue information, and obtaining peak information and hue range information of the target hue histogram; and determining whether there are obstacles in the candidate weeding region image according to the peak information and the hue range information.

In a second aspect, an embodiment of the present disclosure further provides an obstacle recognition apparatus, the apparatus includes:

an information obtaining module, configured to obtain hue information of a candidate weeding region image;

a histogram generation module, configured to generate a target hue histogram of the candidate weeding region image according to the hue information and obtain peak information and hue range information of the target hue histogram; and an obstacle determination module, configured to determinate whether there are obstacles in the candidate weeding region image according to the peak information and the hue range information.

In a third aspect, an embodiment of the present disclosure provides an electronic apparatus, the apparatus includes:

one or more processors;

a storage apparatus, configured to store one or more programs, wherein the one or more programs, when executed by one or more processors, enable the one or more processors to implement the obstacle recognition method.

In a fourth aspect, an embodiment of the present disclosure further provides a computer-readable storage medium, storing a computer program thereon, when the program is executed by a processor, the foregoing obstacle recognition method is implemented.

In a fifth aspect, an embodiment of the present disclosure further provides a weeding robot, including a robot body and the foregoing electronic device.

In the embodiments of the present disclosure, hue information of a candidate weeding region image is obtained, a target hue histogram of the candidate weeding region image according to the hue information is generated and peak information and hue range information of the target hue histogram is obtained, and whether there are obstacles in the candidate weeding region image according to the peak information and the hue range information. Therefore, problems that a lot of manpower and material resources are consumed, and costs are increased because boundaries of weeding regions of weeding robots are generally calibrated by burying boundary lines in existing technologies are solved. In addition, a problem that the shape of a weeding region is limited to some extent due to limitations on the burying of the boundary lines is solved, and recognition efficiency and accuracy of obstacles in a candidate weeding region of a weeding robot are improved.

BRIEF DESCRIPTION OF THE DRAWINGS

FIG. 1 is a flowchart of an obstacle recognition method provided in Embodiment 1 of the present disclosure;

FIG. 2 is a flowchart of an obstacle recognition method provided in Embodiment 2 of the present disclosure;

DETAILED DESCRIPTION OF THE EMBODIMENTS

Figure 3:
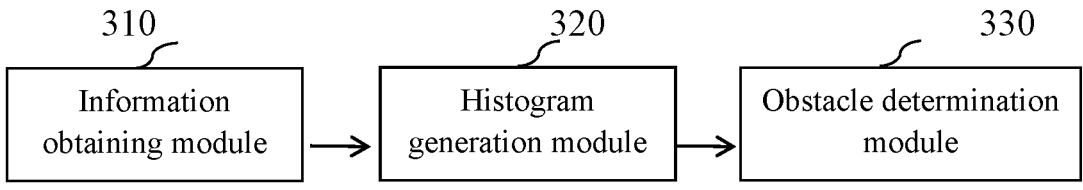
FIG. 3 is a schematic structural diagram of an obstacle recognition apparatus provided in Embodiment 3 of the present disclosure.

The present disclosure will be further described in detail below with reference to the accompanying drawings and embodiments. It should be understood that the specific embodiments described herein are merely used for explaining the present disclosure, rather than limiting the present disclosure. In addition, it should be noted that, for the convenience of description, only some structures related to the present disclosure, not all structures, are shown in the accompanying drawings.

Embodiment 1

FIG. 1 is a flowchart of an obstacle recognition method provided in Embodiment 1 of the present disclosure. This embodiment may be applied to a situation where a weeding robot recognizes obstacles in a candidate weeding region. The method may be performed by an obstacle recognition apparatus provided in an embodiment of the present disclosure, and the apparatus may be implemented by software and/or hardware. With reference to FIG. 1, the obstacle recognition method provided in this embodiment includes:

Step 110: Obtain hue information of a candidate weeding region image.

The candidate weeding region is a region in which a weeding robot may work and in which all weeds may be to be removed, namely, a weeding region—or an obstacle region with similar color to grass, such as yellow or green cardboard or large leaves.

The candidate weeding region image may be captured by a camera installed on the weeding robot, and is not limited in this embodiment. The hue information of the candidate weeding region image is the hue feature of the overall candidate weeding region image. A hue channel image of the candidate weeding region image may be obtained to obtain hue related information in the image, for example, a hue value of each pixel in the image, which is not limited in this embodiment.

Step 120: Generate a target hue histogram of the candidate weeding region image according to the hue information and obtain peak information and hue range information according to the target hue histogram.

The target hue histogram of the candidate weeding region image is generated according to the hue information. The target hue histogram is a histogram generated according to the hue information and used to visually reflect the hue distribution of the candidate weeding region image. The abscissa of the histogram can be the hue value, and the ordinate can be the frequency, which is used to represent the hue distribution of the pixels in the candidate weeding region image. The peak information of the target hue histogram is the information associated with the peak in the target hue histogram, which may be the specific value of the peak in the target hue histogram and is not limited in this embodiment. The hue range information of the target hue histogram is the hue interval information related to obstacle recognition in the target hue histogram.

In this embodiment, optionally, the generating the target hue histogram of the candidate weeding region image according to the hue information, and obtaining the peak information of the target hue histogram includes:

perform histogram statistics on the hue information to generate a to-be-processed hue histogram of the candidate weeding region image;

smooth the to-be-processed hue histogram to obtain a smoothed hue histogram; and generate the target hue histogram according to the smoothed hue histogram and obtain peak information of the target hue histogram.

The to-be-processed hue histogram of the candidate weeding region image is generated directly by performing histogram statistics on the hue information. The to-be-processed hue histogram can embody the specified hue information of pixels within the candidate weeding region image and is, as an example, a hue value distribution statistic for all pixels in the candidate weeding region image, which is not limited in the present embodiment;

The to-be-processed hue histogram is smoothed to remove noises in the to-be-processed hue histogram and improve the accuracy of subsequent obtaining peak information in the target hue histogram generated according to the smoothed hue histogram. The smoothing process may be a filtering process, which is not limited in this embodiment.

The data in the smoothed hue histogram is screened to generate a target hue histogram according to the screened data and obtain peak information of the target hue histogram, which improves the pertinence and accuracy of peak information obtaining.

In the present embodiment, optionally, the generating the target hue histogram according to the smoothed hue histogram and obtaining the peak information of the target hue histogram includes:

determine a set of target peak points and a set of target valley points in a preset hue interval of the smoothed hue histogram according to a preset screening rule; and generate a target hue histogram according to the set of target peak points and the set of target valley points, and obtain peak information of the target hue histogram.

All peak points and valley points within a preset hue interval in the smoothed hue histogram is screened by a preset screening rule to obtain the set of target peak points and the set of target valley points, so as to generate a target hue histogram, optionally, the preset hue interval is 15-95, which is not limited in this embodiment. The target hue histogram is generated according to the set of target peak points and the set of target valley points to improve the pertinence of the generated target hue histogram for obstacle recognition, so as to improve the pertinence and accuracy of peak information obtaining.

In this embodiment, optionally, the preset screening rule includes:

each peak in the set of target peak points is greater than a preset multiple of each valley of the set of target valley points;

a distance between the target peak points is greater than a preset distance threshold; and each peak in the set of target peak points is greater than a preset peak threshold.

Exemplarily, the peak of the target peak points is greater than K times the valley of the target valley points, where K is the preset multiple. The distance between the target peak points is greater than the preset distance threshold D, and the peak of the target peak points is greater than the preset peak threshold M. The peak points and valley points which may be closely related to obstacle recognition are screened by a preset screening rule to generate a target hue histogram.

According to the technical proposal provided by the embodiment, hue information of a candidate weeding region image are obtained, a target hue histogram of the candidate weeding area image is generated according to the hue information and peak information and hue range information of the target hue histogram is obtained, and whether there are obstacles in the candidate weeding region image is determined according to the peak information and the hue range information. Therefore, problems that a lot of manpower and material resources are consumed, and costs are increased because boundaries of weeding regions of weeding robots are generally calibrated by burying boundary lines in existing technologies are solved. In addition, a problem that the shape of a weeding region is limited to some extent due to limitations on the burying of the boundary lines is solved, and recognition efficiency and accuracy of obstacles in a candidate weeding region of a weeding robot are improved.

Embodiment 2

FIG. 2 is a flowchart of an obstacle recognition method provided in Embodiment 2 of the present disclosure. This technical solution supplements the process of determining whether there are obstacles in the candidate weeding region image according to the peak information and the hue range information. Compared with the foregoing solutions, this solution is specifically optimized as follows:

the peak information includes a maximum peak; the hue range information includes a target hue range;

the determining whether there are obstacles in the candidate weeding region image according to the peak information and the hue range information includes:

if the ratio of the maximum peak to the target hue range is greater than the preset ratio threshold, it is determined that there are obstacles in the candidate weeding region image. Specifically, a flowchart of the obstacle recognition method is shown in FIG. 2:

Step 210: Obtain hue information of a candidate weeding region image.

Step 220: Generate a target hue histogram of the candidate weeding region image according to the hue information and obtain peak information of the target hue histogram; the peak information includes a maximum peak; the hue range information includes a target hue range.

The maximum peak is the maximum of all the peaks in the target hue histogram, which indicates the concentration degree of hue value in the candidate weeding region image. The larger the value, the more the number of pixels of the hue value, that is, the more concentrated the hue distribution. The target hue range is a hue interval satisfying a preset condition in the target hue histogram, and, for example, a hue interval having a frequency greater than a preset peak threshold M, which is not limited in the present embodiment.

Step 230: Determine that there are obstacles in the candidate weeding region image if the ratio of the maximum peak to the target hue range is greater than the preset ration threshold.

Exemplarily, the maximum peak is denominated as "maxH", and the target hue range is designated as "width", the ratio of the maximum peak to the target chrominance range is maxH/width. If the preset ratio threshold is 600, the preset information judgment condition is maxH/width>600. When the condition is satisfied, it is determined that there are obstacles such as yellow or green cardboard or large leaves in the candidate weeding region image, which are similar to the grass color. The preset information judgment conditions can be adjusted according to specific judgment situations, which is not limited in this embodiment.

The embodiment of the disclosure determines whether there are obstacles in the candidate weeding region image through the maximum peak and the target hue range, so as to solve the problem that misjudgment is easily caused by judging the obstacles only by a single hue peak under the condition that obstacles or boundaries with similar colors to the grass sometimes appear on the grass, and improve the recognition efficiency and accuracy of obstacles with similar colors to the grass in the candidate weeding region of the weeding robot.

Embodiment 3

FIG. 3 is a schematic structural diagram of an obstacle recognition apparatus provided in Embodiment 3 of the present disclosure. The apparatus may be implemented by hardware and/or software, may implement the obstacle recognition method provided in any embodiment of the present disclosure, and has functional modules and beneficial effects corresponding to the execution method. As shown in FIG. 3, the apparatus includes:

an information obtaining module 310, configured to obtain hue information of a candidate weeding region image;

a histogram generation module 320, configured to generate a target hue histogram of the candidate weeding region image according to the hue information and obtain peak information and hue range information of the target hue histogram; and an obstacle determination module 330, configured to determine whether there are obstacles in the candidate weeding region image according to the peak information and the hue range information.

In the technical solution provided in this embodiment, hue information of a candidate weeding region image is obtained, a target hue histogram of the candidate weeding region image according to the hue information is generated and peak information and hue range information of the target hue histogram is obtained, and whether there are obstacles in the candidate weeding region image is determined according to the peak information and the hue range information. Therefore, problems that a lot of manpower and material resources are consumed, and costs are increased because boundaries of weeding regions of weeding robots are generally calibrated by burying boundary lines in existing technologies are solved. In addition, a problem that the shape of a weeding region is limited to some extent due to limitations on the burying of the boundary lines is solved, and recognition efficiency and accuracy of obstacles in a candidate weeding region of a weeding robot are improved.

On the basis of the foregoing technical solutions, optionally, the histogram generation module includes:

a first histogram generation unit, configured to perform histogram statistics on the hue information and generate a to-be-processed hue histogram of the candidate weeding region image;

a histogram filtering unit, configured to smooth the to-be-processed hue histogram to obtain a smoothed hue histogram; and a second histogram generation unit, configured to generate a target hue histogram according to the smoothed hue histogram and obtain peak information of the target hue histogram.

On the basis of the foregoing technical solutions, optionally, the second histogram generation unit includes:

a set determination subunit, configured to determine a set of target peak points and a set of target valley points in a preset hue interval of the smoothed hue histogram according to a preset screening rule; and a histogram generation subunit, configured to generate a target hue histogram according to the set of target peak points and the set of target valley points, and obtain peak information of the target hue histogram.

On the basis of the foregoing technical solutions, optionally, the screening rule includes:

each peak in the set of target peak points is greater than a preset multiple of each valley of the set of target valley points;

a distance between the target peak points is greater than a preset distance threshold; and each peak in the set of target peak points is greater than a preset peak threshold.

On the basis of the above technical solutions, optionally, the peak information includes a maximum peak; the hue range information includes a target hue range;

the obstacle determination module includes:

an obstacle determination unit, configured to determine that there are obstacles in the candidate weeding region image if the ratio of the maximum peak to the target hue range is greater than a preset ratio threshold.

Embodiment 4

Figure 4:
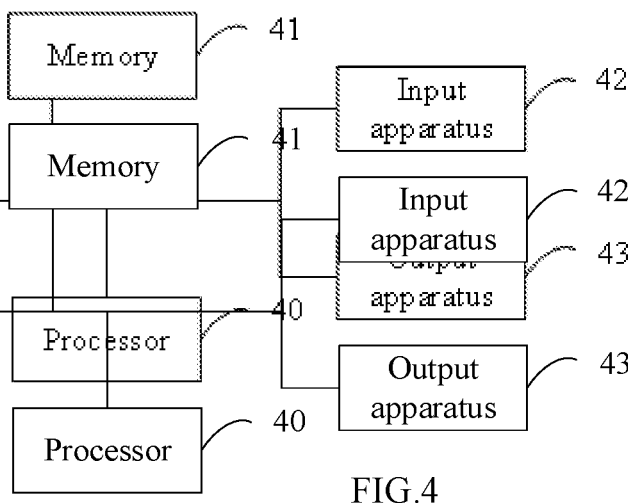
FIG. 4 is a schematic structural diagram of an electronic device provided in Embodiment 4 of the present disclosure.

FIG. 4 is a schematic structural diagram of an electronic device provided in Embodiment 4 of the present disclosure. As shown in FIG. 4, the electronic device includes a processor 40, a memory 41, an input apparatus 42, and an output apparatus 43. The electronic device may include one or more processors 40. One processor 40 is used as an example in FIG. 4. The processor 40, the memory 41, the input apparatus 42, and the output apparatus 43 in the electronic device may be connected through a bus or in other ways. A bus connection is used as an example in FIG. 4.

As a computer-readable storage medium, the memory 41 may be used to store software programs, computer executable programs, and modules, such as program instructions/modules corresponding to the obstacle recognition method in the embodiments of the present disclosure. The processor 40 performs various functional applications of the electronic device and data processing by running the software programs, instructions, and modules stored in the memory 41, to implement the foregoing obstacle recognition method.

The memory 41 may mainly include a program storage area and a data storage area, where the program storage area may store an operating system, and an application program required for at least one function; and the data storage area may store data created according to use of a terminal, etc. In addition, the memory 41 may include a high speed random access memory, and may also include a non-volatile memory, such as at least one of a magnetic disk storage device, a flash memory, or other non-volatile solid-state storage device. In some examples, the memory 41 may further include memories arranged remotely from the processor 40, and these remote memories may be connected to the electronic device through a network. Examples of the network include, but are not limited to, the Internet, an intranet, a local area network, a mobile communications network, or a combination thereof.

Embodiment 5

Embodiment 5 of the present disclosure further provides a storage medium including computer-executable instructions, the computer-executable instructions being configured to perform an obstacle recognition method when executed by a computer processor, and the method including:

obtain hue information of the candidate weeding region image;

generate a target hue histogram of the candidate weeding region image according to the hue information, and obtain peak information and hue range information of the target hue histogram;

determine whether there are obstacles according to the peak information and the hue range information.

Of course, the computer-executable instructions included in the storage medium provided in the embodiment of the present disclosure are not limited to the foregoing method operations, but may also be used for performing related operations in the obstacle recognition method provided in any embodiment of the present disclosure.

From the above description of the embodiments, those skilled in the art may clearly understand that the present disclosure may be implemented by means of software and necessary general-purpose hardware, and of course may also be implemented by hardware, but the former is better in many cases. Based on such an understanding, the technical solution of the present disclosure substantially, or the part of the present disclosure making contribution to the prior art may be embodied in the form of a software product, and the computer software product may be stored in a computer-readable storage medium, such as a floppy disk of a computer, a read-only memory (ROM), a random access memory (RAM), a flash, a hard disk or a CD, including a quantity of instructions enabling a computer device (which may be a personal computer, a server, or a network communication device) to perform the method described in each embodiment of the present disclosure.

It is worth noting that, in the foregoing embodiment of the obstacle recognition apparatus, the included units and modules are only divided according to functional logics, but are not limited to the foregoing division, as long as the corresponding functions can be implemented. In addition, the specific names of the functional units are only for the convenience of distinguishing from each other, and are not configured to limit the protection scope of the present disclosure.

Embodiment 6

Embodiment 6 of the present disclosure provides a weeding robot, including a robot body and the electronic device described in any embodiment of the present disclosure.

Specifically, the electronic device installed on the weeding robot may perform related operations of the obstacle recognition method described in any embodiment of the present disclosure.

The robot body may include a left driving wheel and a right driving wheel, which may be driven by motors separately. The motors may be brushless motors with a gearbox and a Hall sensor. The robot body controls the speed and direction of the two driving wheels to implement forward, backward, turning, and arc driving operations. The robot body further includes a universal wheel, a camera, and a rechargeable battery, where the universal wheel plays a supporting and balancing role. The camera is installed at a designated position of the robot and is at a preset angle to a horizontal direction to capture a candidate weeding region image. The rechargeable battery is configured to provide power for the robot to work.

It should be noted that the above are only preferred embodiments of the present disclosure and applied technical principles. Those skilled in the art may understand that the present disclosure is not limited to the specific embodiments described herein, and various obvious changes, readjustments and substitutions can be made by those skilled in the art without departing from the protection scope of the present disclosure. Therefore, although the present disclosure is described in detail through the above embodiments, the present disclosure is not limited to the above embodiments, and may further include more other equivalent embodiments without departing from the concept of the present disclosure. The scope of the present disclosure is determined by the scope of the appended claims.

The invention claimed is:

1. An obstacle recognition method comprising the steps of:

obtaining hue information of a candidate weeding region image;

generating a target hue histogram of the candidate weeding region image according to the hue information, and obtaining peak information and hue range information of the target hue histogram; and determining whether there are obstacles in the candidate weeding region image according to the peak information and the hue range information, wherein:

the peak information comprises a maximum peak;

the hue range information comprises a target hue range; and the step of determining whether there are obstacles in the candidate weeding region image according to the peak information and the hue range information comprises the step of determining if there are obstacles in the candidate weeding region image, if the ratio of the maximum peak to the target hue range is greater than a preset ratio threshold.

2. The method according to claim 1, wherein the step of generating a target hue histogram of the candidate weeding region image according to the hue information and obtaining peak information and hue range information of the target hue histogram comprises the steps of:

performing histogram statistics on the hue information to generate a to-be-processed hue histogram of the candidate weeding region image;

smoothing the to-be-processed hue histogram to obtain a smoothed hue histogram; and generating the target hue histogram according to the smoothed hue histogram, and obtaining the peak information and the hue range information of the target hue histogram.

3. The method according to claim 2, wherein the step of generating the target hue histogram according to the smoothed hue histogram and obtaining the peak information and the hue range information of the target hue histogram comprises the steps of:

determining a set of target peak points and a set of target valley points in a preset hue interval of the smoothed hue histogram according to a preset screening rule; and generating the target hue histogram according to the set of target peak points and the set of target valley points, and obtaining the peak information and the hue range information of the target hue histogram.

4. The method according to claim 3, wherein the preset screening rule is determined utilizing the following values:

each peak in the set of target peak points is greater than a preset multiple of each valley in the set of target valley points;

the distance between the target peak points is greater than a preset distance threshold; and each peak in the set of the target peak points is greater than a preset peak threshold.

5. An electronic device comprising:

one or more processors; and a storage apparatus configured to store one or more programs, wherein the one or more programs, when executed by one or more processors, enable the one or more processors to implement the obstacle recognition method according claim 1.

6. A weeding robot comprising a robot body, and further comprising the electronic device according to claim 5.

7. A computer-readable storage medium storing a computer program thereon, wherein when the program is executed by a processor, the obstacle recognition method according to claim 1 is implemented.

8. An obstacle recognition apparatus comprising:

an information obtaining module configured to obtain hue information of a candidate weed region image;

a histogram generation module configured to generate a target hue histogram of the candidate weeding region image according to the hue information and to obtain peak information and hue range information of the target hue histogram; and an obstacle determination module configured to determine whether there are obstacles in the candidate weeding region image according to the peak information and the hue range information, wherein:

the peak information comprises a maximum peak;

the hue range information comprises a target hue range; and the obstacle determination module determines if there are obstacles in the candidate weeding region image, if the ratio of the maximum peak to the target hue range is greater than a preset ratio threshold.

9. The apparatus according to claim 8, wherein the histogram generation module comprises:

a first histogram generation unit configured to perform histogram statistics on the hue information to generate a to-be-processed hue histogram of the candidate weeding region image;

a histogram filtering unit configured to smooth the to-be-processed hue histogram to obtain a smoothed hue histogram; and a second histogram generation unit configured to generate the target hue histogram according to the smoothed hue histogram and obtain the peak information of the target hue histogram.

\* \* \* \* \*